United States Patent [19]

Westerhoven

[11] 4,116,137
[45] Sep. 26, 1978

[54] PLANTER FOR TREES, HERBS, SHRUBS AND SIMILAR PLANTS

[76] Inventor: Henry Westerhoven, 2030 S. Bainbridge Ctr. Rd., Benton Harbor, Mich. 49022

[21] Appl. No.: 800,409

[22] Filed: May 25, 1977

[51] Int. Cl.² ............................................. A01C 11/00
[52] U.S. Cl. ..................................................... 111/2
[58] Field of Search ................. 111/1, 2, 3, 77, 79, 111/80, 81, 62

[56] References Cited

U.S. PATENT DOCUMENTS

| 736,252 | 8/1903 | Hering | 111/2 |
|---|---|---|---|
| 1,152,402 | 9/1915 | Draper | 111/2 |
| 1,958,875 | 5/1934 | Weichert | 111/3 |
| 2,719,498 | 10/1955 | Goolsby | 111/62 X |
| 2,960,944 | 11/1960 | Poll | 111/2 |
| 3,744,441 | 7/1973 | Smith et al. | 111/1 |
| 3,831,536 | 8/1974 | Orthman | 111/1 |

FOREIGN PATENT DOCUMENTS

| 35,626 | 8/1908 | Austria | 111/2 |
|---|---|---|---|
| 934,123 | 5/1948 | France | 111/3 |

Primary Examiner—Edgar S. Burr
Assistant Examiner—James R. Feyrer
Attorney, Agent, or Firm—Oltsch, Knoblock & Hall

[57] ABSTRACT

A vehicular planter for trees, herbs, shrubs and similar plants in which a trough which is transversely oriented relative to the direction of movement of the planter is formed in the ground by a fore and aft moving blade. A conveyor carried by the planter positions a row of plants with their roots extending into the trough. Thereafter, the blade of the planter forms a second trough adjacently ahead of the first formed trough and simultaneously therewith causes the second trough to be filled with dirt to cover the roots of the plants located in the first formed trough. This sequence is repeated to produce multiple rows of plants in the ground.

7 Claims, 20 Drawing Figures

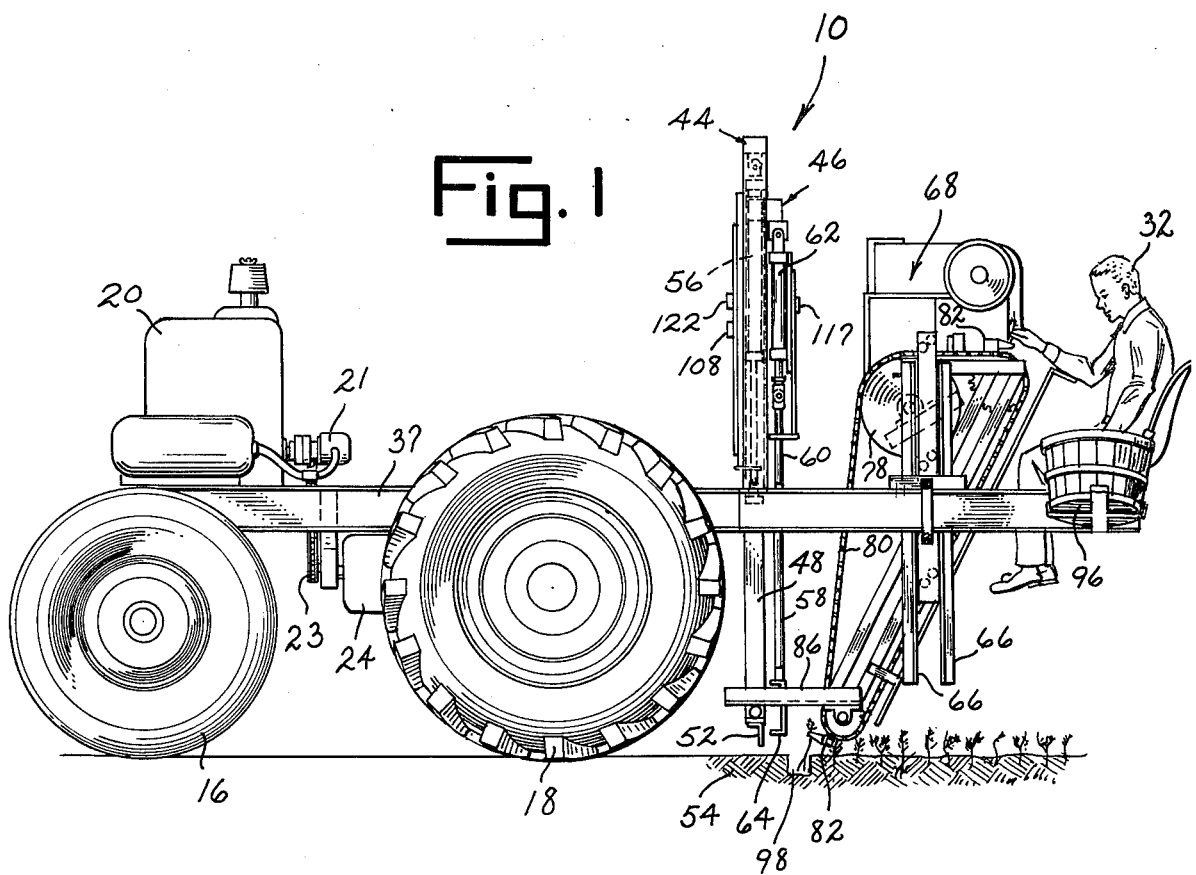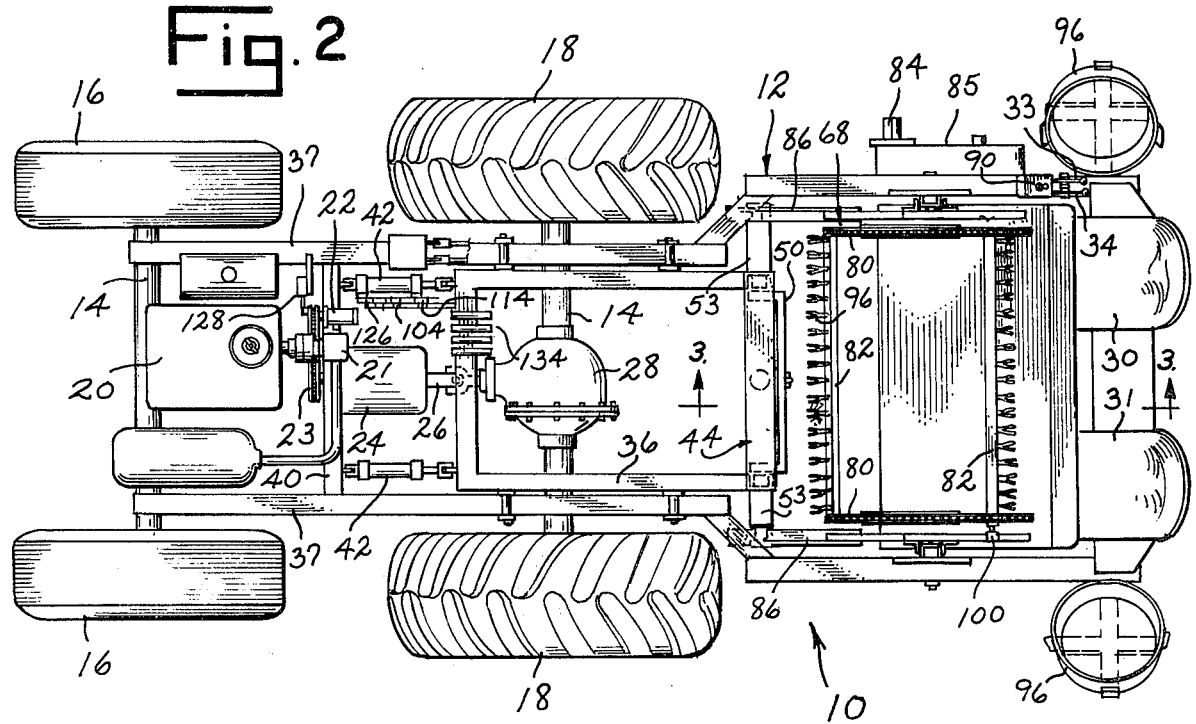

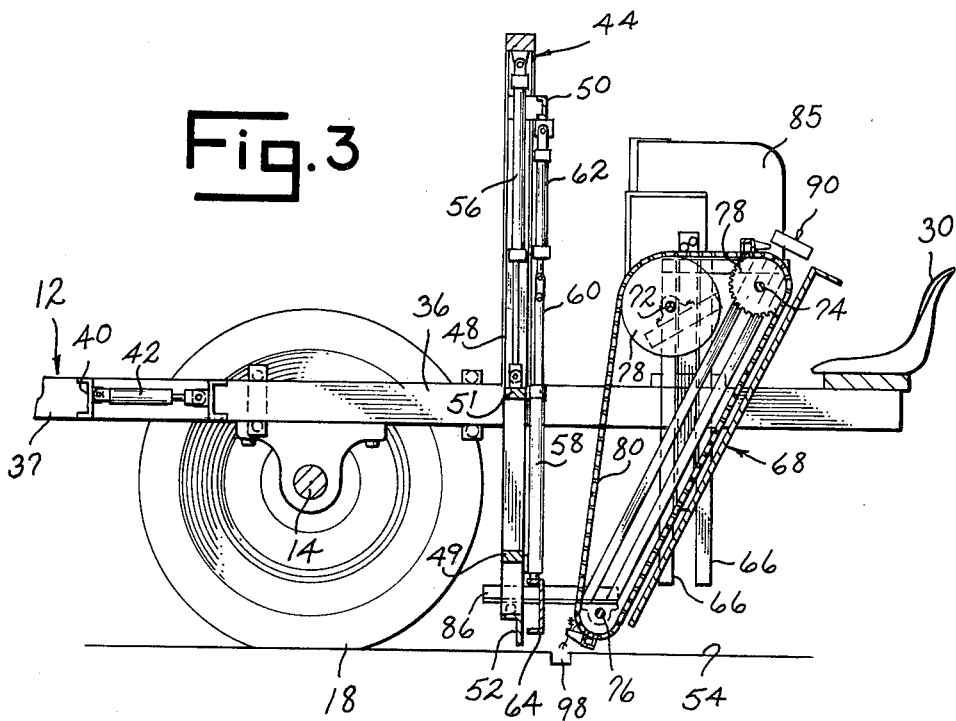
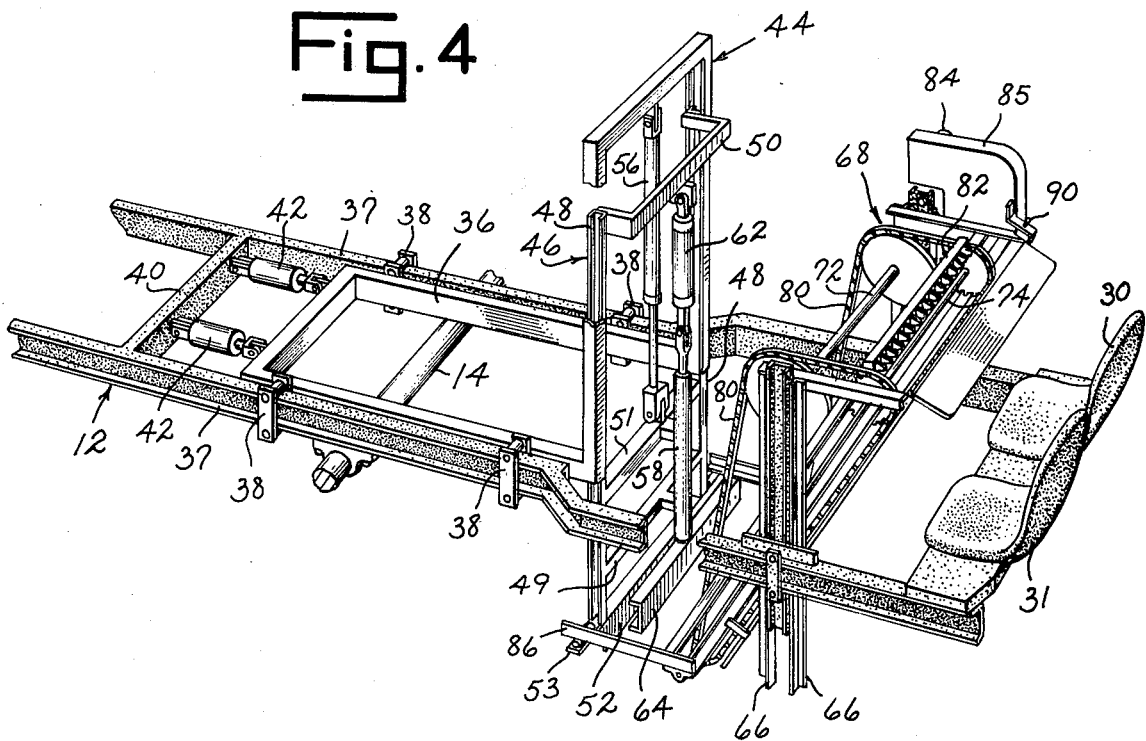

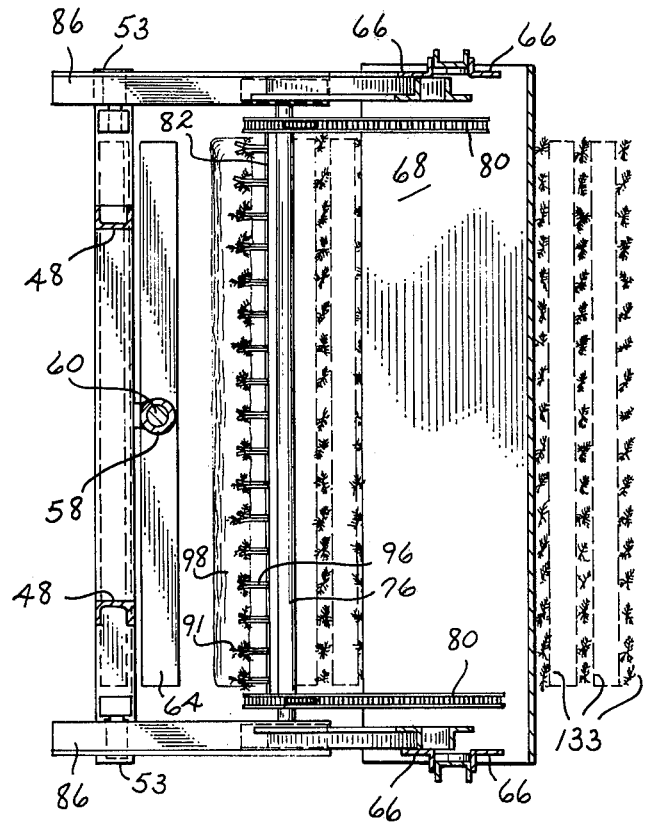
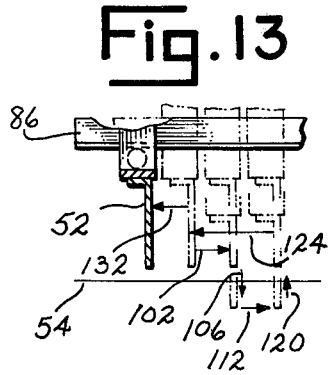
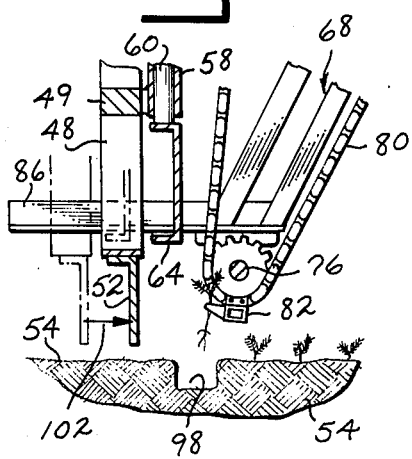
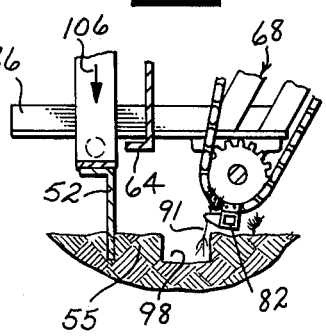
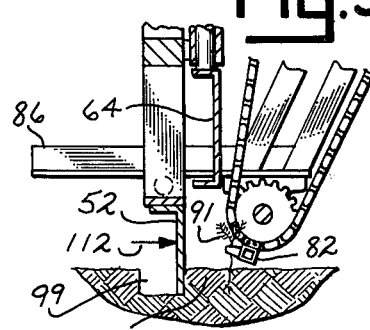
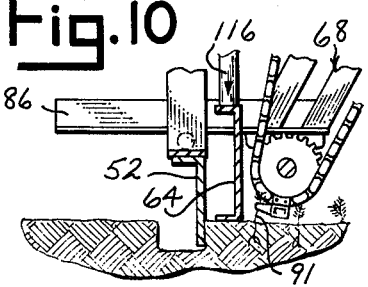
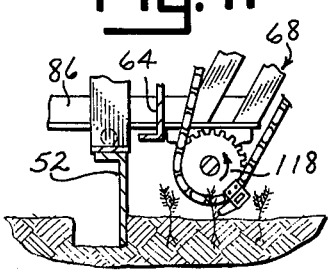
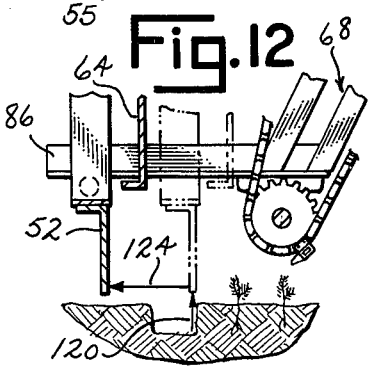

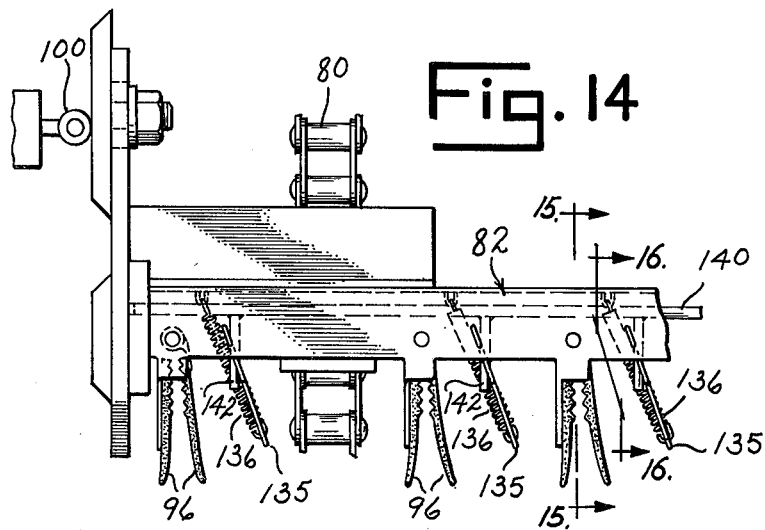
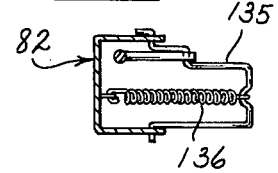
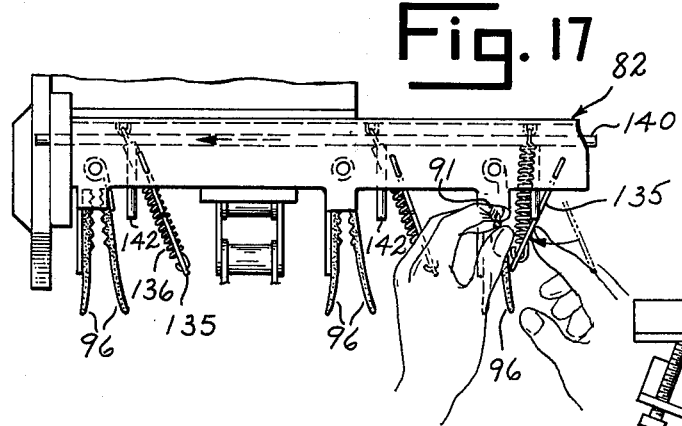
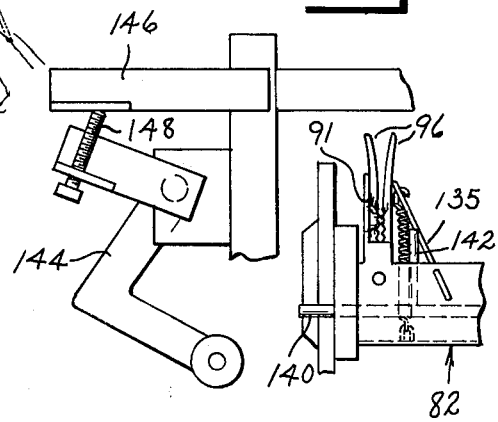
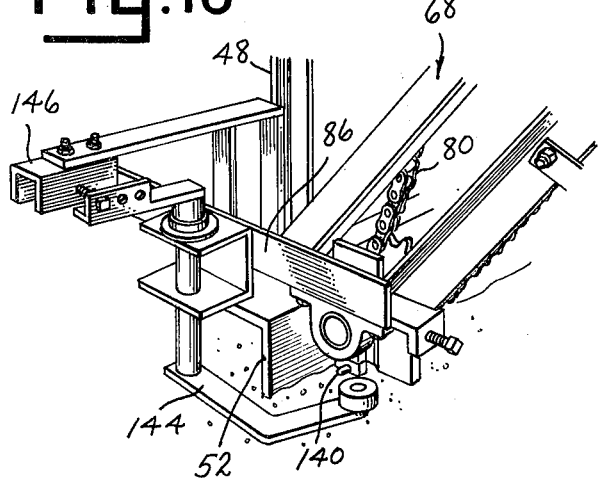
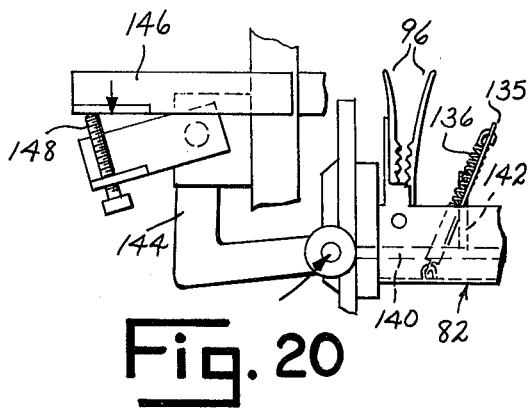

4,116,137

PLANTER FOR TREES, HERBS, SHRUBS AND SIMILAR PLANTS

SUMMARY OF THE INVENTION

This invention relates to a planter for trees, herbs, shrubs and similar plants and will have specific but not limited application in planting multiple rows of closely spaced young plants.

The planter of this invention includes a chassis which is supported upon wheels for movement over the ground. A blade is carried by the chassis and is shiftable into ground engagement for the purpose of forming a trough which extends transversely relative to the direction of movement of the planter.

A conveyor device is also carried by the planter chassis and has one end positioned adjacent the location of the trough which is formed by the planter blade. The conveyor device includes a plant bar which supports a plurality of young plants. Rotation of the conveyor device serves to position the plant bar next to the trough formed by the blade, with the roots of the plants extending into the trough. The blade of the planter then forms an additional or new trough adjacently forwardly of the trough into which the plants extend, causing the dirt next to the newly formed trough to fill the trough into which the plants extend. Upon formation of the new trough and the filling of the plant accommodating trough the conveyor device is rotated to free the plants from the plant bar so as to allow additional plants to be placed within the bar for subsequent planting. The planter is then moved forwardly a selected distance and the planter blade lowered to form another trough with the coordinating rotation of the plant bar and positioning of other plants in the previously formed open trough. This planting sequence is repeated with successive rows of young plants being planted in the ground.

The planter of this invention can be utilized to plant a plurality of young plants two and one-half inches apart in four foot wide rows, with each row of plants being positioned two and one-half inches apart. Planting in this manner is particularly advantageous in the nursery business since the close spacing between plants retards and hinders weed growth, thereby making it generally unnecessary to weed between the plants prior to their removal and replanting at a later stage in their growth.

Accordingly, it is an object of this invention to provide a planter which is for young plants, such as trees, herbs, shrubs, and which has the capacity for planting a plurality of such plants in multiple rows at closely spaced intervals.

Another object of this invention is to provide a planter for young trees in which such trees in their seedling state can be planted in rapid fashion at closely spaced apart intervals in closely spaced rows.

It is another object of this invention to provide a method of planting a plurality of young plants in multiple rows in a rapid manner.

Other objects of this invention will become apparent upon a readng of the invention's description.

BRIEF DESCRIPTION OF THE DRAWINGS

FIG. 1 is a side elevational view of the planter shown in operation.

FIG. 2 is a top plan view of the planter.

FIG. 3 is a fragmentary sectional view taken along line 3—3 of FIG. 2.

FIG. 4 is a fragmentary perspective view of the chassis of the planter illustrating the blade, packer and conveyor parts of the invention.

FIG. 6 is a fragmentary sectional taken along line 6—6 of FIG. 5.

FIGS. 7-12 are fragmentary sectional views of the blade, packer and conveyor parts shown in operational sequence.

FIG. 13 is a fragmentary sectional view of the planter blade shown in solid lines, with sequential broken line operative positions.

FIG. 14 is a fragmentary detailed view of a modified construction of the plant bar.

FIG. 15 is a sectional view taken along line 15—15 of FIG. 14.

FIG. 16 is a sectional view taken along line 16—16 of FIG. 14.

FIG. 17 is a fragmentary perspective view of the plant bar showing a plant being attached to the bar.

FIG. 18 is a fragmentary perspective view of a trip mechanism to release the plants held by the plant bar.

FIG. 19 is a top plan view of the trip mechanism prior to actuation.

FIG. 20 is a top plan view of the trip mechanism shown releasing the plants held by the plant bar.

DESCRIPTION OF THE PREFERRED EMBODIMENTS

Figure 5:
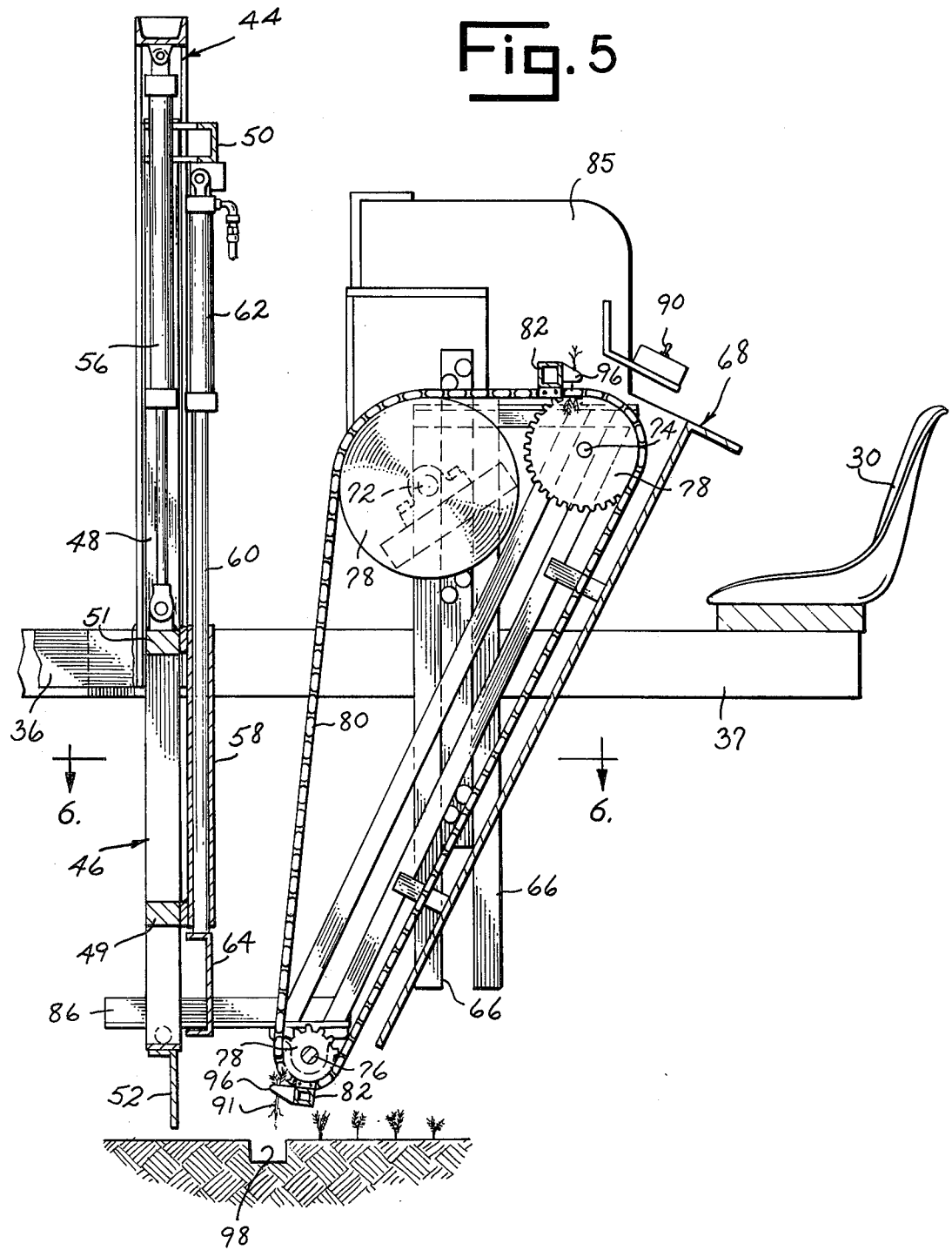
FIG. 5 is a detailed view of the blade, packer and conveyor parts illustrated in fragmentary sectionalized form.

The preferred embodiments illustrated are not intended to be exhaustive or to limit the invention to the precise forms disclosed. They are chosen and described in order to best explain the principles of the invention and its application and practical use to thereby enable others skilled in the art to best utilize the invention.

Planter 10 includes a frame or chassis 12 to which are connected axles 14 journaling a front pair of wheels 16 and a rear pair of wheels 18. A motor 20 is carried upon chassis 12 and is operatively connected to a hydraulic pump 21. Pump 21 is connected through a solenoid to a hydraulic motor 22 which in turn is operatively connected by a chain drive 23 to a transmission 24. Transmission 24 is connected by a driveshaft 26 to a differential 28 associated with axle 14 of rear wheels 18. Motor 20 is of the gasoline type, but, if desired, may be of an electrical type which is battery operated. Chassis 12 extends rearwardly of rear wheels 18 and carries a pair of chairs 30 and 31 in which one or more operators 32 are seated during the planting operation. Axle 14 mounting front tires 14 is pivotally connected to chassis 12 so as to be rotatable and thus allow an operator 32 of the planter to turn the planter. Forward and reverse movement as well as steering of the planter is controlled by operating levers 33 and 34 suitably linked to transmission 24 and front wheel axle 14 and positioned adjacent operator chair 30.

A horizontal box frame 36 is carried by chassis 12 over rear wheel axle 14 between longitudinal frame parts 37 of the chassis. Box frame 36 is shiftably mounted to chassis 12 by rollers 38 and is connected at its forward end to a transverse chassis frame member 40 by a pair of hydraulic cylinders 42. Operation of cylinders 42 causes box frame 36 to shift forwardly and rearwardly relative to chassis 12 along the direction of travel of planter 10.

An upright inverted U-frame 44 is secured to the rear end of box frame 36 and located just rearwardly of rear wheels 18. A slide frame 46 is carried by upright frame and box frame 36. Slide frame 46 includes vertical side members 48 which fit within upright frame 44 for sliding movement and which are interconnected by cross members 49, 50 and 51. A transverse blade 52 is connected at the lower ends of side members 48 of slide frame 46. Blade member 52 is raised and lowered relative to chassis 12 of planter 10 and the underlying ground 54 by a hydraulic cylinder 56 which is connected between upright frame 44 at its upper end and cross frame member 51 of slide frame 46. Through the coordinated operation of cylinders 42 and 56 which causes the forward and rearward movement of box frame 36 and the upward and downward movement of slide frame 46, blade 52 can be moved in four directions, fore and aft and upwardly and downwardly.

A tubular guide 50 having a vertical orientation is connected to cross members 51 and 49 of slide frame 46. A rod 60 extends through guide 58 and has its upper end connected to a hydraulic cylinder 62 which is connected to upper cross member 50 of slide member 46. A packer bar 64 is connected to the lower end of rod 60. Bar 64 parallels blade 52 and is located just rearwardly of the blade. Actuation of cylinder 56 causes the joint up and down movement of blade 52 and bar 64. Actuation of cylinder 62 causes packer bar 64 to raise and lower with respect to slide frame 46 and blade 52.

A pair of vertical rails 66 are mounted to each longitudinal frame part 37 of chassis 12 between chairs 30 and 31 and slide frame 46. A conveyor device 68 is located between chassis frame parts 37 and is guidably supported for vertical shiftable movement by rails 66. Conveyor device 68 includes transverse shafts 72, 74 and 76 which carry guides and sprockets 78. A pair of parallel chains 80 are trained about sprockets 78 and are located at the extreme sides of the conveyor device. A pair of plant bars 82 are connected to chains 80 and extend transversely across the width of the conveyor device. The spacing between planter bars 82 is such that with one plant bar being located under shaft 76 near the level of ground 54 the other plant bar will be located above shaft 74 in front of chairs 30 and 31. Thus upon rotation of sprockets 78, plant bars 82 will be alternatively positioned at ground level near shaft 76 or at chair level above shaft 74.

Conveyor device 68 includes a hydraulic motor 84 which is drive connected by a transmission 85 to shaft 74. Vertical shiftable movement of conveyor device 68 within rails 66 relative to chassis 12 is coordinated with the up and down movement of blade 52. This is accomplished through the use of a pair of lift bars 86 which are connected to opposite sides of the conveyor device near shaft 76 and which extend forwardly of the conveyor device and rest upon extensions 53 of blade 52. Thus with lift bars 86 resting upon blade 52 conveyor device 68 will be raised when blade 52 is raised and will be lowered through its own weight when the blade is lowered. Lift bars 86 are not connected to blade 52 so as to permit the blade to shift longitudinally or fore and aft relative to the conveyor device. Hydraulic pump 21 powered by motor 20 serves to actuate cylinders 42, 56 and 62 and motor 84. A description of the operation of planter 10 will now follow.

Operator 32 sitting in chair 30 initiates the planting operation by pushing an actuator button 90 carried by conveyor device 68. Button 90 is a switch device which initiates the planting sequence by actuating hydraulic pump 21. Prior to pushing button 90 to start the planting operation, young plants, which may be of the tree, shrub or herb variety, are inserted into plant bar 82 which is located in front of the operator. Such young plants are carried in baskets 96 located adjacent chairs 30 and 31. To speed the planting operation, a second operator may utilize seat 31. Each plant bar 82 includes a plurality of pairs of opposed fingers 96 which are positioned in spaced relation along the longitudinal dimension of the bar. Fingers 96 are flexible and may be formed of a rubber or plastic composition to enable the operator of planter 10 to gently place the stalk of the plants between the compressive fingers with their roots up.

After the upper plant bar 82 is filled with plants having their roots positioned upwardly, operator 32 pushes actuator button 90 and motor 84 of conveyor device 68 is actuated to cause rotation of plant bars 82 in a counterclockwise direction as viewed in the figures until the plant carrying plant bar 82 is located in the position illustrated in FIGS. 1, 3 and 5 under conveyor shaft 76. A trip carried by each plant bar 82 contacts a limit switch 100 to deactivate motor 84 and stop rotation of the plant bars. The plants 91 in lower positioned plant bar 82 are now held upright with their roots located over previously formed trough 98 in ground 54. During this rotation of plant bars 82, blade 52 carried by slide frame 46 is located in its forwardmost position above ground 54. Upon actuation of limit switch 100 which stops the plant carrying plant bar 82 above trough 98, cylinders 42 are actuated which cause box frame 36 to be slid rearwardly relative to chassis 12 from the broken line forwardmost position to the solid line center position as indicated by arrow 102 in FIG. 7, where a limit switch 104 associated with box frame 36 is tripped to halt the rearward movement of the frame.

Once blade 52 reaches its center position illustrated in FIG. 7 and switch 104 is tripped to halt the rearward advancement of the blade, cylinder 56 associated with slide frame 46 is actuated to cause blade 52 to be lowered into the ground 54 for a selected distance as indicated by arrow 106 in FIG. 8. The depth which blade 54 enters the ground is regulated by a limit switch 108 associated with slide frame 46. As blade 52 is urged into the ground as shown in FIG. 8, conveyor device 68 shifts downwardly with the blade so as to position the roots of the plants 91 carried by the lower plant bar 82 in trough 98.

When the downward advance of blade 52 and its supported conveyor device 68 is halted by the actuation of switch 108, cylinders 42 are actuated which causes box frame 36 to again move rearwardly, thereby causing blade 52 to shift from its center position shown in FIG. 8 to its rearwardmost position illustrated in FIG. 9, moving the dirt 55 in front of the blade rearwardly into previously formed trough 98 and against the roots of plants 91 within the trough as indicated by arrow 112 in FIG. 9. During this movement of blade 52, planter 10 remains in a stationary location on the ground. The rearward movement of blade 52 is stopped by a limit switch 114 associated with box frame 36. With blade 52 located in its rearwardmost position as seen in FIG. 9 and upon actuation of limit switch 114, cylinder 62 associated with packer bar 64 is actuated to cause the packer bar to be lowered into contact with underlying ground 54, as illustrated by arrow 116 in FIG. 10, to pack the dirt about the roots of plants 91. When the hydraulic pressure within the cylinder 62 reaches a predetermined amount, such as 600 lbs. in the preferred embodiment, the solenoid which operates cylinder 62 is reversed, causing the packer bar to be raised into its former upper position where contact is made with a limit switch 117 to halt the upward movement of the bar Upon actuation of limit switch 117, motor 84 of conveyor drive 68 is actuated to cause limited rotation of plant bars 82. Upon such rotation the lower plant bar 82 as illustrated by arrow 118 in FIG. 11 is rotated rearwardly which frees plants 91 from the grip of paired fingers 96. This movement of plant bars 82 is limited to approximately a two-inch turn which is sufficient to free plants 91 by the repeated actuation of limit switch 100 of the conveyor device. Upon the second actuation of switch 100 the movement of plant bars 82 ceases with the uppermost bar being positioned just fowardly of operator 32 in preparation for restocking with young plants. As limit switch 100 of the conveyor device 68 is tripped to stop the movement of plant bars 82 upon release of plants 91, cylinder 56 is actuated to raise blade 52 into its broken line upper position as indicated by arrow 120 in FIG. 12. As blade 52 is moved from its lower into its upper position, conveyor device 68 is also carried upwardly with the blade. Upward movement of blade 52 is halted by contact with a limit switch 122. Upon actuation of switch 122, cylinders 42 are actuated which move blade 52, as indicated by arrow 124 in FIG. 12, into its forwardmost position. The blade is stopped in its forwardmost position by a limit switch 126 associated with box frame 36. Upon actuation of switch 126 which stops the advancement of raised blade 52 in its forwardmost position, motor 22 is actuated to cause planter 10 to move forwardly as a unit a selected distance, at which time another limit switch 128 is contacted by a stop carried upon the transmission drive chain 23 to halt the movement of the planter. This completes one planting cycle of the planter. At this time operator 32 will have completed stocking the upper plant bar 82 with new young plants. After the advancement of planter 10 has been halted by switch 128 and the upper plant bar restocked, operator 32 will again push actuator button 90 to repeat the heretofore described planting cycle.

With each new planting cycle a new trough 99 for receiving the roots of the young plants is formed by the rearward movement of blade 52. Such rearward movement of blade 52 causes the dirt in front of the blade to cover the previously formed trough into which the roots of the plants have been previously positioned by rotation of the plant bars 82. The five-step movement of blade 52, corresponding by reference number designation to the positions of the blade illustrated in FIGS. 7–12, is shown in broken lines in FIG. 13, while arrow 132 in the figure illustrates the movement of planter 10 and the positioning of blade 52 to start another planting cycle. The amount of incremental advancement of planter 10 over the ground to position blade 52 will vary, depending upon the desired spacing between rows 133 of the plants. Hydraulic cylinders 42, 56, 62 and motors 22 and 84 are operatively connected to solenoids 134 which upon selected limit switch actuation cause hydraulic pump 21 to be hydraulically coupled to the cylinders and motors. Suitable circuitry connects the limit switches to the solenoids.

In FIGS. 14–20, a modified embodiment of plant bars 82 is illustrated. A wire holder 135 is pivotally carried by bar 82 next to each pair of fingers 96 which in this embodiment are normally spaced apart. A spring 136 is connected between each holder 135 and bar 82 in such a manner so as to create an overcenter mechanism. In FIG. 14 holders 135 are shown in an overcenter position spaced from associated fingers 96. As a plant 91 is positioned between a pair of fingers 96, the operator of the planter manually pushes the adjacent holder 135 into contact with the fingers which by the urging of spring 136 serves to maintain the holder in contact with the fingers, thereby maintaining the fingers in a closed plant-gripping position. An actuator rod 140 extends the length of each plant bar 82 and includes a plurality of trip parts 142 which are each associated with a holder 135. Trip parts 142 serve to shift each holder 135 from its finger contacting position illustrated in FIG. 19 into a spaced position illustrated in FIG. 20 upon longitudinal movement of rod 140.

Longitudinal movement of rod 140 is accomplished by means of a pivot arm 144 carried by one of the lift bars 86 connected to conveyor device 68. A trip arm 146 is connected to one of the vertical side members 48 of slide frame 46 and is positioned so that as blade 52 is shifted from its center position illustrated in FIG. 8 to its rearwardmost position illustrated in FIG 9 the trip arm will contact pivot arm 144 causing the pivot arm to engage the protruding end of rod 140 to cause the rod to shift longitudinally within plant bar 86, thereby shifting holders 135 away from fingers 96. This movement of holders 135 from fingers 96 allows the fingers to spread apart, thereby freeing the held plants. Thereafter, the plant bars 82 are rotated sufficiently far enough to allow the fingers 96 of the lower bar to clear underlying plants 91 now seated within the ground. Screw 148 connected to pivot arm 144 is provided to accommodate adjustment in the amount of longitudinal movement of rod 140.

It is to be understood that the invention is not to be limited to the details above given, but may be modified within the scope of the appended claims.

What I claim is:

1. A planter for trees, shrubs, herbs and similar plants comprising a chassis, wheel means supporting said chassis for movement over the ground in a selected direction of travel, a blade carried by said chassis and extending transversely to said direction of chassis travel, said blade being shiftable relative to said chassis along said direction of chassis travel between fore and aft positions, said blade being further shiftable relative to said chassis between a lower ground engaging position and an upper position spaced from said ground, a conveyor carried by said chassis and including means for releasably supporting a plurality of plants in a row extending transversely to the direction of said chassis travel, means for shifting said blade from its said upper and fore positions into its said lower and aft positions for forming a trough in said ground transversely relative to the direction of chassis travel, said conveyor having one end located rearwardly of and extending to adjacent said blade in its lower and aft positions, means for rotating said conveyor to position said plant supporting means at said trough with the plants extending into the trough, said blade shifting means for shifting said blade from its lower and aft trough forming positions into its upper and fore positions and thereafter again into its lower and aft positions adjacently forwardly of said trough to cover said trough and the plants where they extend therein and simultaneously form another trough paralleling and located forwardly of said first mentioned trough, and means for rotating said wheel means to move said chassis forwardly to position said conveyor one end adjacent said other trough whereby said conveyor may be rotated to position said plant supporting means at said other trough with additional plants being carried thereby extending into said other trough.

2. The planter of claim 1 and seat means carried by said chassis rearward of said conveyor to enable an operator to sit when placing plants within said plant supporting means.

3. The planter of claim 1 and guide means connecting said conveyor to said chassis for vertical shiftable movement relative to the chassis, said blade including means supporting said conveyor for coordinated upper and lower movement with said blade as the blade shifts between its upper and lower positions, said conveyor when in its lower position serving to position said plant supporting means next to the ground at said first mentioned trough, said conveyor supporting means including means for permitting movement of said blade between its fore and aft positions relative to said conveyor.

4. The planter of claim 3 and packer means for compacting the dirt around said plants when positioned by said plant supporting means within said first mentioned trough, said packer means positioned between said blade and said conveyor one end, means for shifting said packer means between an upper position and a lower ground engaging compacting position when said blade is in its lower and aft positions.

5. The planter of claim 4 wherein said blade includes a frame member supported by said chassis for vertical shiftable movement, said packer means carried by said frame member and being shiftable vertically and independently of said blade.

6. The planter of claim 3 wherein said conveyor includes an endless drive part supporting a plurality of transverse bars at spaced locations, each bar constituting said plant supporting means and including a plurality of pairs of opposing finger means for clamping said plants therebetween.

7. The planter of claim 6 wherein each pair of finger means has a normal open plant releasing position, each bar carrying a plurality of pivoted contacts, one of said contacts associated with each pair of finger means, biasing means associated with each contact for urging said contact against one of its associated finger means to urge said pair of finger means into a closed plant clamping position, trip means carried by each bar for urging said contacts away from said finger means to release said plants, said blade when shifted into its lower and aft positions including means for contacting the trip means of a bar when located at said first mentioned trough to urge said contacts away from the finger means of such bar whereby plants carried by said finger means will be released as said first mentioned trough is covered during formation of said other trough.

* * * * *